June 21, 1966 C. E. SWANSON 3,256,805
HINGED CRUMB TRAY FOR ELECTRIC TOASTER
Filed July 10, 1964 2 Sheets-Sheet 1
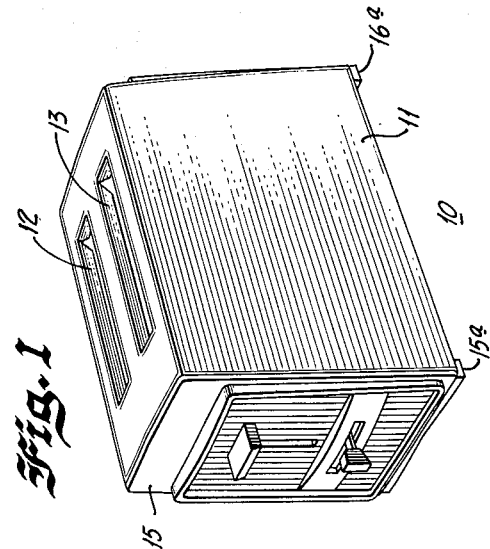
INVENTOR
CHARLES E. SWANSON
by
George R. Clark
ATT'Y.

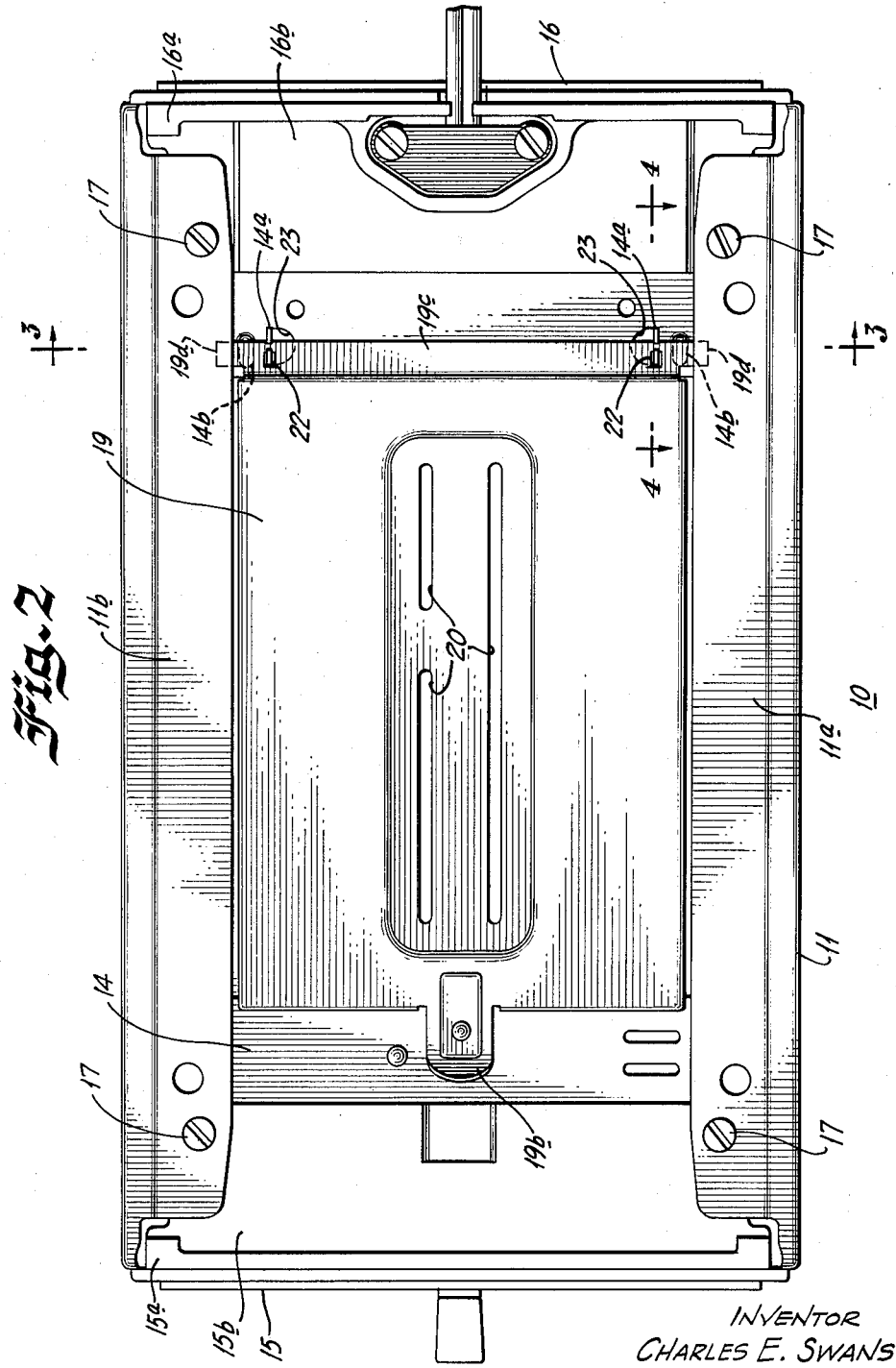

United States Patent Office 3,256,805
Patented June 21, 1966

3,256,805
HINGED CRUMB TRAY FOR ELECTRIC TOASTER
Charles E. Swanson, Cook County, Ill., assignor to Sunbeam Corporation, Chicago, Ill., a corporation of Illinois
Filed July 10, 1964, Ser. No. 381,836
8 Claims. (Cl. 99—400)

The present invention relates to an electric toaster, and more particularly to a hinged crumb tray for such an electric toaster.

It has been common practice to provide electric toasters with a movable crumb tray so that the user may periodically move the crumb tray from its crumb receiving position beneath the toasting wells of a toaster to remove crumbs collected therein. It has also been common practice to pivotally relate one end of such crumb trays to the underside of the associated toaster while the other end of said trays are releasably latched in a crumb receiving position beneath the toasting wells. When it is desired to dispose of the crumbs collected in such crumb tray, the user releases the latch and pivots the crumb tray about its hinge.

Heretofore hinged crumb trays have either been relatively expensive so as to add substantially to the manufacturing cost of the toaster, or they have been of a rather flimsy and unsatisfactory construction. It would be desirable to provide a hinged crumb tray which requires no additional parts, which can be manufactured as a simple, very inexpensive stamping operation and which provides the hinging action of an expensive, high quality hinge.

Accordingly, it is an object of the present invention to provide a new and improved hinged crumb tray for an electric toaster.

It is another object of the present invention to provide an improved pivotal support for a crumb tray for an electric toaster which requires no additional parts, which may be manufactured by simple, inexpensive manufacturing techniques and which results in a high quality hinging action.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a perspective view of a representative toaster with which the hinged crumb tray of the present invention is associated;

FIG. 2 is an enlarged bottom view of the toaster of FIG. 1 showing the hinged crumb tray in what might be termed the latched or crumb receiving position;

FIG. 3 is a fragmentary sectional view taken on line 3—3 of FIG. 2;

FIG. 4 is an enlarged fragmentary sectional view taken on line 4—4 of FIG. 2;

FIG. 5 is a sectional view similar to FIG. 4 but showing the crumb tray in the fully open position; and FIG. 6 is a fragmentary sectional view taken on line 6—6 of FIG. 5 assuming that FIG. 5 shows the complete structure.

Briefly, the present invention is concerned with an arrangement in which a pair of bifurcated bend tabs cut from the base member depend from the latter as a pair of spaced ears defining hinge portions. The crumb tray comprises a sheet metal stamping having a pair of spaced openings in a lateral flange projecting from one end. These openings are adapted to receive therein one bifurcation of each of said spaced ears. The crumb tray is also provided with end extensions of said lateral flange which underlie portions of the toaster housing, and specifically the cover shell thereof, so that the crumb tray, once it is hingedly related with the tabs, cannot be removed unless the toaster is disassembled. Moreover, the bifurcations are defined by sort of a keyhole-shaped slot, and the circular portion of the keyhole providing a very satisfactory hinge portion.

Referring now to the drawings, there is illustrated an electric toaster generally designated at 10, the particular construction or configuration thereof, except the crumb tray and crumb tray hinge members, forming no part of the present invention. The illustrated toaster 10 may be very similar to that disclosed and claimed in a copending Jepson et al. application, Serial No. 380,822, filed July 7, 1964, and assigned to the same assignee as the instant application. As illustrated, the toaster 10 comprises the conventional toaster housing defined in part by a cover shell 11 having a pair of bread receiving slots 12 and 13, which cover shell is secured to a suitable base member 14 (FIGS. 2, 3, 4, 5 and 6 where only small portions of the base member are visible). Preferably and as disclosed in the above-mentioned Jepson et al. application, the toaster housing includes a pair of molded end plates 15 and 16 including depending portions 15a and 16a, respectively, defining legs or supporting means for the toaster 10. The end plates 15 and 16 are illustrated as each comprising an integral ledge or shelf portion 15b and 16b, respectively, which shelf portions are directed toward each other to provide end supports upon which the base member 14, preferably comprising a sheet metal stamping, may rest.

As illustrated, the cover shell 11 is provided with inturned flanges 11a and 11b extending beneath the base or base member 14 and the end plate projections 15b and 16b. The end plates 15 and 16, the cover shell 11 and the base 14 are joined together as a unitary assembly by suitable fastening means 17 which extend through aligned openings in the inturned flanges 11a and 11b of the cover shell 11 and in the ledges 15b and 16b of the end plates 15 and 16 to engage openings in the base 14.

It will be understood that the base member 14 supports the conventional heating elements for the toaster associated with suitable toasting wells. Usually a suitable bread carriage is employed to move the bread slices between bread receiving and toasting positions. These features of an electric bread toaster form no part of the present invention and, hence, are neither illustrated nor described hereinafter.

In accordance with the present invention, there is provided a crumb tray 19, preferably made as a sheet metal stamping of rectangular configuration, having a narrow upturned periphery 19a (FIGS. 4 and 5) so as to define a shallow crumb receiving member. So that air circulation may take place through the toasting wells, the bottom of the crumb tray 19 is provided with a plurality of slots 20. One end of the crumb tray 19, which may be designated as the latching end, is provided with an integral extension 19b (FIG. 2) defining a finger grip member to which is secured a suitable latching member (not shown) for making latching engagement with a portion of the base 14. The other end of the crumb tray is provided with an integral narrow hinge flange 19c extending laterally from the top edge of upturned periphery 19a.

In order to prevent disassembly of the crumb tray 19 from the rest of the toaster 10 without first removing fastening means 17, the hinge flange 19c includes end projections 19d (FIGS. 2, 3 and 6) at either end thereof which extend beyond the edge of the crumb tray periphery 19a, best shown in FIG. 2 of the drawings. These projections 19a, in accordance with the present invention, cooperate both with the base 14 and cover shell 11, as described hereinafter.

To provide pivot members on crumb tray 19 to define hinge portions, the hinge flange 19c is provided with a pair of spaced rectangular elongated apertures or openings 22 which may be formed therein during the stamping operation. Preferably the material removed from apertures 22 defines stop members 19f along the inside long edge of each aperture, as best shown in FIGS. 3 and 6 of the drawings. The longitudinal axes of the openings 22 are perpendicular to the longitudinal axis of hinge flange 19c. The spaces between the adjacent ends of the apertures 22 and the edge of hinge flange 19c remote from crumb tray 19 define narrow trunnions or pivot members 19e (FIGS. 4 and 5) for pivoting crumb tray 19 about an axis interconnecting said trunnions.

From the above description it will be apparent that the crumb tray 19, the hinge flange 19c, interlock end projections 19d and trunnions 19e can all be readily manufactured as a simple, inexpensive sheet metal stamping.

In order to provide a simple, inexpensive cooperating hinge member for pivotally engaging the trunnions 19e, the base member 14 is provided with a pair of spaced bend tabs 14a defining ears depending beneath base 14. These ears are stamped from base 14 leaving openings 23 in the base adjacent the ears. The ears 14a are spaced apart the same distance as the trunnions 19e.

In accordance with the present invention, each of the ears 14a is bifurcated with a keyhole-spaced slot 25, as best shown in FIGS. 4 and 5 of the drawings. These slots each include at the closed end an enlargement 25a, preferably of circular form for pivotally receiving the trunnions 19e. The width of slots 25 is somewhat greater than the thickness of hinge flange 19c and the diameter of each enlargement 25a is slightly greater than the width of one of the trunnions 19e. It will be readily appreciated that during an assembly operation the crumb tray 19 can be pivotally related to the ears 14a by moving it to a position such that hinge flange 19c can be inserted in the aligned slots 25 until the trunnions 19e engage the closed ends of these slots, as shown in FIG. 5 of the drawings. Thereafter crumb tray 19 can be pivoted to the closed position shown in FIG. 4 of the drawings, the trunnions 19e rotating within the circular enlargements 25a of slots 25. It will be understood that the stop members 19f are engageable with the adjacent faces of ears 14a to limit movement of crumb tray 19 in the direction of the longitudinal axis of hinge flange 19c thus insuring that the bifurcations of ears 14a remain in alignment with openings 22.

For the purpose of providing a smooth pivotal motion, the base 14 is deformed to provide a pair of spaced integral dimples 14b, the dimples depending downwardly beneath the toaster toward the interlock projections 19d of hinge flange 19c. It will be apparent that unless the crumb tray is substantially in the position shown in FIG. 5 of the drawings, it will be impossible to remove the same from pivotal connection with the ears 14a, since the width of the trunnion portions 19e is substantially that of the diameter of the circular portion 25a of the keyhole slots 25.

In order that the crumb tray cannot be removed when the crumb tray is in the fully open position shown in FIGS. 5 and 6 of the drawings, the lateral projections 19d are disposed between the inturned flanges 11a and 11b of the shell 11 and the dimples 14b of the base 14. The flanges 11a and 11b, as best shown in FIG. 6 of the drawings, engage interlock projections 19d to maintain the lower edges of trunnions 19e within the enlargements 25a to insure smooth crumb tray hinging action from the position shown in FIGS. 5 and 6 to the position shown in FIG. 4 of the drawings. Disassembly of the toaster is, therefore, necessary to remove crumb tray 19 once the toaster 10 is completely assembled.

With the above-described arrangement, the entire hinging of the crumb tray 19 is accomplished by simple sheet metal stamping operations without the requirement of any additional parts for the hinges. Moreover, the result is a very satisfactory hinge which, due to the circular portions of the keyhole slots, gives a hinge action with a quality feel and yet wherein it is impossible to inadvertently remove the crumb tray from its hinged relationship with the toaster 10 except upon disassembly of the toaster.

In view of the detailed description included above, the operation of the improved hinged crumb tray of the present invention will readily be understood by those skilled in the art and no further discussion is included herewith.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. A hinged crumb tray for a toaster of the type comprising a base member supporting a plurality of heating elements defining a toasting well wherein the heating elements are enclosed by a cover shell; the improvement comprising a pair of spaced ears depending from said base member adjacent one end of said toasting well, said ears each including a downwardly opening slot having an enlarged portion remote from the opening of each slot, a crumb tray in the form of a sheet metal stamping including a laterally projecting hinge flange at one end, and means defining a pair of apertures in said flange spaced apart the same distance as the spacing between said ears, portions of said flange defining said apertures comprising trunnions rotatable in the enlarged portions of said slots, said trunnions being insertible into said slots when the plane of said crumb tray is disposed downwardly whereby said flange may be moved into said slots until said trunnions are received in the enlarged portions of said slots.

2. The hinged crumb tray of claim 1 wherein said base member includes spaced deformations whereby said hinge flange can engage said base member only at said deformations.

3. The hinged crumb tray of claim 1 wherein said enlarged portions are circular and said trunnions have a width slightly smaller than the diameter of said circular portions of said slots.

4. A hinged crumb tray for a toaster of the type comprising a base member supporting a plurality of heating elements defining a toasting well wherein the heating elements are enclosed by a cover shell; the improvement comprising a pair of spaced ears depending from said base member adjacent one end of said toasting well, said ears each including a downwardly opening slot having a circular portion at the blind end of each slot, a crumb tray in the form of a sheet metal stamping including a laterally projecting hinge flange at one end, means defining a pair of apertures in said flange spaced apart the same distance as the spacing between said ears, portions of said flange defining said apertures comprising trunnions rotatable in the circular portions of said slots, said trunnions being insertible into said slots when the plane of said crumb tray is disposed perpendicularly to the plane of said base member whereby said flange may be moved into said slots until said trunnions are received in the circular portions of said slots, and means comprising extensions at each end of said flange engageable by said cover shell for retaining said trunnions in said circular portions even when the plane of the crumb tray is perpendicular to the plane of said base member.

5. For use with a toaster having a base member, a plurality of heating elements supported on said base member, said heating elements defining a toasting well for toasting a bread slice disposed therein, and a cover shell enclosing said heating elements; the improvement comprising a pair of spaced parallel ears depending from said base member adjacent one end of said toasting well, said ears including aligned downwardly opening identical slots including circular enlargements at the blind ends of said slots, a hinged crumb tray in the form of a sheet metal stamping including a laterally projecting flange at the hinged end thereof, means defining a pair of openings in said flange spaced apart the same distance as the spacing between said ears, the portions of said flange at the ends of said openings remote from said crumb tray defining trunnions receivable in the circular enlargements of said slots, said trunnions being insertible into said slots when the plane of said crumb tray is perpendicular to the plane of said base member whereby said flange may be moved into said aligned slots, and means engageable by said cover shell for retaining said trunnions in said circular enlargements even when the plane of said crumb tray is perpendicular to the plane of said base member.

6. For use with a toaster having a base member, a plurality of heating elements supported on said base member, said heating elements defining a toasting well for toasting a bread slice disposed therein, and a cover shell enclosing said heating elements; the improvement comprising a pair of spaced parallel ears depending from said base member adjacent one end of said toasting well, said ears including aligned downwardly opening identical slots including circular enlargements at the blind ends of said slots, a hinged crumb tray in the form of a sheet metal stamping including a laterally projecting flange at the hinged end thereof, means defining a pair of openings in said flange spaced apart the same distance as the spacing between said ears, the portions of said flange at the ends of said openings remote from said crumb tray defining trunnions receivable in the circular enlargements of said slots, said trunnions being insertible into said slots when the plane of said crumb tray is perpendicular to the plane of said base member whereby said flange may be moved into said aligned slots, and means comprising extensions at the ends of said flange engageable by said cover shell for retaining said trunnions in said circular enlargements even when the plane of said crumb tray is perpendicular to the plane of said base member.

7. The improvement of claim 5 wherein said last-mentioned means comprises portions of said flange extending beyond said crumb tray so as to be disposed between said base member and portions of said cover shell disposed beneath said base member.

8. The hinged crumb tray of claim 1 wherein stop members are provided on said hinge flange engageable with said ears to limit transverse movement of said crumb tray.

References Cited by the Examiner

UNITED STATES PATENTS

| | | | |
|---|---|---|---|
| 1,850,894 | 3/1932 | Punte et al. | 220—32 |
| 2,229,945 | 1/1941 | Uhlrig | 99—400 |
| 2,545,404 | 3/1951 | Young | 99—400 |
| 2,596,243 | 5/1952 | Ireland | 99—400 X |
| 2,655,095 | 10/1953 | McCullough | 99—400 |

FOREIGN PATENTS 816,300 10/1951 Germany.

WALTER A. SCHEEL, *Primary Examiner.*

BILLY J. WILHITE, *Examiner.*